Patented Oct. 1, 1940

2,216,258

UNITED STATES PATENT OFFICE 2,216,258

ANTHRAQUINONE DYESTUFFS

Klaus Weinand, Leverkusen-I. G. Werk, and August Modersohn, Cologne-Mulheim, Germany, assignors to General Aniline & Film Corporation, a corporation of Delaware No Drawing. Application May 3, 1939, Serial No. 271,507. In Germany May 6, 1938

5 Claims. (Cl. 260—192)

This invention relates to the preparation of new dyestuffs of the anthraquinone series and has for its object the preparation of compounds corresponding to the following general formula

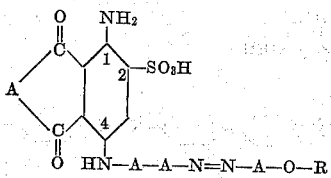

wherein R stands for hydrogen or alkyl and wherein each of the A's stands for a bivalent radical of the benzene series, which compounds are valuable yellowish green substantive dyestuffs of excellent fastness properties which are especially distinguished by their great affinity to the vegetable fiber. They may contain in 6- or 7-position halogens or sulfodialkyl amido groups and in 5- or 8-position acetyl-amino or alkoxy groups.

The dyestuffs of our invention may be prepared by causing 1-amino-4-halogenanthraquinone-2-sulfonic acids or substitution products thereof to react with aminodiphenyl-azophenol derivatives in aqueous or alcoholic-aqueous solution with the addition of an acid binding agent, i. e. a salt of a weak acid as, for instance, soda or sodium bicarbonate, and a suited copper salt as a catalyst. The amino-diphenyl-azophenol derivatives which are used as starting materials are obtained by coupling the diazo compounds of monoacylated benzidine derivatives with phenol compounds and subsequent splitting off the acyl group.

The following examples illustrate the invention without, however, restricting it thereto, the parts being by weight:

Example 1

A mixture of 10 parts of 1-amino-4-bromo-anthraquinone-2-sulfonic acid sodium, 10 parts of 4'-aminodiphenyl-azophenol of the following formula

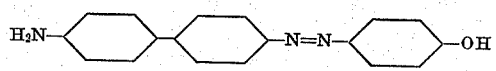

(obtainable by coupling the diazo compound of the monoacetyl-benzidine with phenol and subsequent splitting off the acetyl group), 10 parts of sodium bicarbonate and one part of cuprous chloride is stirred in a mixture of 100 parts of water and 50 parts of ethyl alcohol for half an hour in the cool and then boiled for 2–3 hours while refluxing, whereby an olive-green solution is obtained. On cooling this solution the dyestuff thus formed separates in green crystals. The crystals thus separated are filtered with suction and purified by dissolving in water and salting out.

The dyestuff thus obtained is soluble in water with a yellowish-green coloration and dyes cotton from the Glauber's salt bath yellowish-green shades of excellent fastness properties to light and water.

Example 2

A mixture of 10 parts of 1-amino-4-bromo-anthraquinone-2-sulfonic acid sodium, 10 parts of 4'-aminodiphenyl-azophenol-methylether-3-sulfonic acid of the following formula

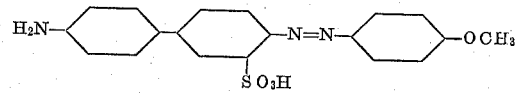

10 parts of sodium bicarbonate, and one part of cuprous chloride is slowly heated to 80–90° in 150 parts of water for 3–4 hours while stirring. The dyestuff thus formed separates even in the hot state in form of green crystals which are filtered with suction and purified as indicated in Example 1.

The condensation product thus obtained is soluble in water with a green coloration and dyes cotton, synthetic vegetable fiber respectively, strong green shades of excellent fastness properties to light and of good fastness properties to water.

By using instead of 4'-aminodiphenyl-azophenol-methylether-3-sulfonic acid the corresponding ethylether or methyl-sulfonic acid ester, dyestuffs of similar properties are obtained. The azo-derivatives employed in this reaction are obtained by coupling the diazo compound of the monoacetyl-benzidine sulfonic acid with phenol, alkylating the phenolic OH-group, and subsequently splitting off the acetyl residue.

Example 3

A mixture of 10 parts of 1-amino-4-bromo-anthraquinone-2-sulfonic acid sodium, 10 parts of 4'-aminodiphenyl-azo-salicylic acid of the following formula

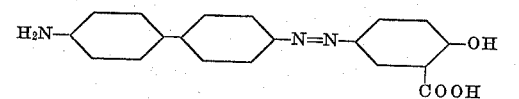

(obtainable by coupling the diazo compound of the benzidine-mono-oxaminic acid with salicylic acid and splitting off the oxalyl residue), 10 parts of sodium bicarbonate and one part of cuprous bromide is stirred in 150 parts of water for 4–5 hours at a temperature of 80–90°. From the yellowish-green solution thus formed the dyestuff is separated on cooling or on adding sodium chloride. It is filtered with suction and purified in the usual manner by dissolving in water and allowing to crystallize. The dyestuff has a green coloration and dyes the vegetable fiber strong shades.

We claim:

1. The dyestuffs of the following general formula

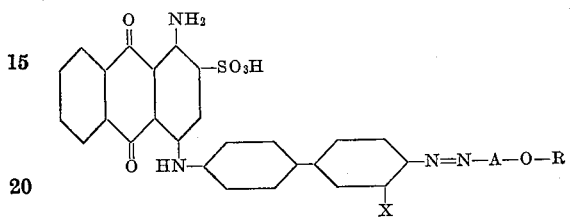

wherein R stands for hydrogen or alkyl, A stands for a bivalent radical of the benzene series, and X stands for a member of the group consisting of hydrogen and the sulfonic acid group.

2. Dyestuffs of the following formula

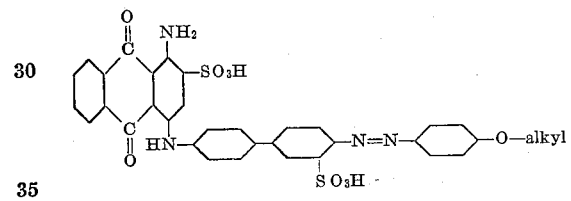

3. The dyestuff of the following formula

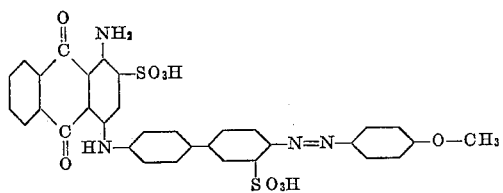

4. The dyestuff of the following formula

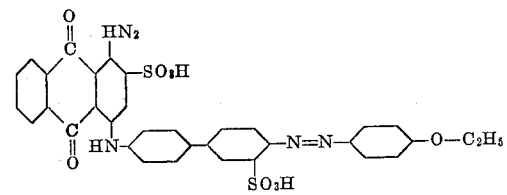

5. The dyestuff of the following formula

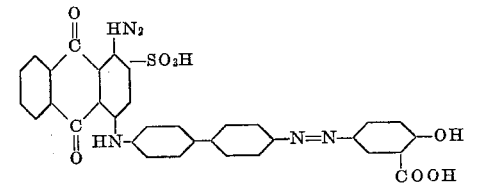

KLAUS WEINAND.
AUGUST MODERSOHN.